(12) United States Patent
Fujimoto

(10) Patent No.: US 11,018,364 B2
(45) Date of Patent: May 25, 2021

(54) FLOW BATTERY

(71) Applicant: Panasonic Intellectual Property Management Co., Ltd., Osaka (JP)

(72) Inventor: Masahisa Fujimoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 101 days.

(21) Appl. No.: 16/167,531

(22) Filed: Oct. 23, 2018

(65) Prior Publication Data

US 2019/0058207 A1 Feb. 21, 2019

Related U.S. Application Data

(63) Continuation of application No. PCT/JP2017/022302, filed on Jun. 16, 2017.

(30) Foreign Application Priority Data

Jul. 19, 2016 (JP) .............................. JP2016-141441

(51) Int. Cl.
H01M 8/00 (2016.01)
H01M 8/18 (2006.01)
(Continued)

(52) U.S. Cl.
CPC .......... *H01M 8/188* (2013.01); *H01M 4/382* (2013.01); *H01M 4/5825* (2013.01);
(Continued)

(58) Field of Classification Search
None
See application file for complete search history.

(56) References Cited

U.S. PATENT DOCUMENTS

2012/0135278 A1* 5/2012 Yoshie ................... H01M 8/20
429/7
2013/0224550 A1* 8/2013 Bugga .................. H01M 8/188
429/105
(Continued)

FOREIGN PATENT DOCUMENTS

JP 2013037856 A * 2/2013
WO 2010/143634 12/2010

OTHER PUBLICATIONS

Machine translation of JP 2013037856 A (Year: 2013).*
(Continued)

*Primary Examiner* — Milton I Cano
*Assistant Examiner* — Mary G Henshaw
(74) *Attorney, Agent, or Firm* — McDermott Will and Emery LLP

(57) ABSTRACT

A flow battery includes: a first liquid containing dissolved therein a condensed aromatic compound and lithium; a first electrode immersed in the first liquid; and a first circulator including a first container and a first passage prevention member. The first liquid containing the condensed aromatic compound dissolved therein has the property of causing the lithium to release solvated electrons and dissolve as cations. When the lithium dissolved in the first liquid precipitates on the first electrode, lithium precipitate particles are generated. The first circulator circulates the first liquid between the first electrode and the first container. The first circulator transfers the lithium precipitate particles generated on the first electrode to the first container. The first passage prevention member is disposed in a channel through which the first liquid flows from the first container to the first electrode. The first passage prevention member prevents passage of the lithium precipitate particles.

17 Claims, 8 Drawing Sheets

(51) Int. Cl.
    *H01M 4/58*     (2010.01)
    *H01M 12/08*     (2006.01)
    *H01M 4/38*     (2006.01)
    *H01M 8/023*     (2016.01)
    *H01M 8/04186*     (2016.01)
    *H01M 8/20*     (2006.01)

(52) U.S. Cl.
    CPC ....... *H01M 8/023* (2013.01); *H01M 8/04186* (2013.01); *H01M 8/20* (2013.01); *H01M 12/08* (2013.01); *H01M 2300/0025* (2013.01); *H01M 2300/0071* (2013.01); *Y02E 60/50* (2013.01)

(56) References Cited

U.S. PATENT DOCUMENTS

| | | |
|---|---|---|
| 2014/0227620 A1 | 8/2014 | Perry |
| 2015/0255803 A1 | 9/2015 | Delnick et al. |
| 2015/0280259 A1 | 10/2015 | Anderson et al. |
| 2016/0056490 A1* | 2/2016 | Chiang .................. H01M 8/20 429/104 |

OTHER PUBLICATIONS

McMurry and Fay's Chemistry, Fourth Edition (2003), Table 18.1 Standard Reduction Potentials at 25C (Year: 2003).*

Yang, "A membrane-free lithium/polysulfide semi-liquid battery for large-scale energy storage", Energy and Environmental Science (Year: 2013).*

The Extended European Search Report dated Jul. 9, 2019 for the related European Patent Application No. 17830767.4.

International Search Report of PCT application No. PCT/JP2017/022302 dated Aug. 15, 2017.

* cited by examiner

| COMPOUND | MOLAR CONCENTRATION (M) | POTENTIAL (V vs. Li/Li$^+$) |
|---|---|---|
| PHENANTHRENE  | 1 | 0.03 |
| BIPHENYL  | 1 | 0 |
| o-TERPHENYL  | 1 | 0.15 |
| trans-STILBENE  | 0.5 | 0.3 |
| TRIPHENYLENE  | 0.1 | 0.01 |
| ANTHRACENE  | 0.1 | 0.05 |

2000

| COMPOUND | MOLAR CONCENTRATION (M) | POTENTIAL (V vs. Li/Li$^+$) |
|---|---|---|
| BUTYROPHENONE  | 0.1 | 0.3 |
| VALEROPHENONE  | 0.1 | 0.31 |
| ACENAPHTHENE  | 0.1 | 0.016 |
| ACENAPHTHYLENE  | 0.1 | 0.014 |
| FLUORANTHENE  | 0.1 | 0.014 |
| BENZIL  | 0.1 | 0.16 |

FIG. 5

| SAMPLE NAME | BIPHENYL CONCENTRATION [M] | LiBF$_4$ CONCENTRATION [M] | POTENTIAL [V vs. (Li/Li$^+$)] |
|---|---|---|---|
| SAMPLE A1 | 0.1 | 1 | 1.2 |
| SAMPLE A2 | 0.1 | 0.7 | 1.1 |
| SAMPLE A3 | 0.1 | 0.5 | 0.87 |
| SAMPLE A4 | 0.1 | 0.2 | 0.21 |
| SAMPLE A5 | 0.1 | 0.1 | 0.006 |
| SAMPLE A6 | 0.1 | 0.05 | 0.003 |
| SAMPLE A7 | 0.1 | 0.025 | 0.003 |
| SAMPLE A8 | 0.1 | 0 | 0.002 |
| SAMPLE A9 | 1 | 1 | 0.004 |
| SAMPLE A10 | 1 | 0.5 | 0 |
| SAMPLE A11 | 1 | 0.1 | 0 |

FIG. 6

| SAMPLE NAME | BIPHENYL CONCENTRATION [M] | LiN(SO$_2$CF$_3$)$_2$ CONCENTRATION [M] | POTENTIAL [V vs. (Li/Li$^+$)] |
|---|---|---|---|
| SAMPLE B1 | 0.1 | 0.5 | 1.95 |
| SAMPLE B2 | 0.1 | 0.1 | 0.007 |
| SAMPLE B3 | 0.1 | 0.05 | 0.003 |
| SAMPLE B4 | 0.1 | 0.0 | 0 |

FIG. 7

| SAMPLE NAME | BIPHENYL CONCENTRATION [M] | LiN(SO$_2$F)$_2$ CONCENTRATION [M] | POTENTIAL [V vs. (Li/Li$^+$)] |
|---|---|---|---|
| SAMPLE C1 | 0.1 | 0.5 | 2.5 |
| SAMPLE C2 | 0.1 | 0.1 | 0.17 |
| SAMPLE C3 | 0.1 | 0.05 | 0.08 |
| SAMPLE C4 | 0.1 | 0.0 | 0 |

FIG. 8

| SAMPLE NAME | BIPHENYL CONCENTRATION [M] | LiCF$_3$SO$_3$ CONCENTRATION [M] | POTENTIAL [V vs. (Li/Li$^+$)] |
|---|---|---|---|
| SAMPLE D1 | 0.1 | 0.5 | 0.78 |
| SAMPLE D2 | 0.1 | 0.1 | 0.002 |
| SAMPLE D3 | 0.1 | 0.05 | 0.002 |
| SAMPLE D4 | 0.1 | 0.0 | 0 |

FIG. 9

| SAMPLE NAME | trans-STILBENE CONCENTRATION [M] | LiBF$_4$ CONCENTRATION [M] | POTENTIAL [V vs. (Li/Li$^+$)] |
|---|---|---|---|
| SAMPLE E1 | 0.1 | 1 | 1.32 |
| SAMPLE E2 | 0.1 | 0.4 | 1.28 |
| SAMPLE E3 | 0.1 | 0.2 | 1.0 |
| SAMPLE E4 | 0.1 | 0.1 | 0.42 |
| SAMPLE E5 | 0.1 | 0.05 | 0.33 |
| SAMPLE E6 | 0.1 | 0 | 0.3 |
| SAMPLE E7 | 0.4 | 0.4 | 0.56 |
| SAMPLE E8 | 0.4 | 0.2 | 0.28 |
| SAMPLE E9 | 0.4 | 0.1 | 0.25 |

FIG. 10

| SAMPLE NAME | BIPHENYL CONCENTRATION [M] | LiPF$_6$ CONCENTRATION [M] | POTENTIAL [V vs. (Li/Li$^+$)] |
|---|---|---|---|
| SAMPLE F1 | 0.1 | 1 | 0.001 |
| SAMPLE F2 | 0.1 | 0.5 | 0.000 |
| SAMPLE F3 | 0.1 | 0.1 | 0.006 |
| SAMPLE F4 | 0.1 | 0.05 | 0.009 |
| SAMPLE F5 | 0.1 | 0.0 | 0 |

FIG. 11

| SAMPLE NAME | trans-STILBENE CONCENTRATION [M] | LiPF$_6$ CONCENTRATION [M] | POTENTIAL [V vs. (Li/Li$^+$)] |
|---|---|---|---|
| SAMPLE G1 | 0.1 | 1 | 0.29 |
| SAMPLE G2 | 0.1 | 0.5 | 0.26 |
| SAMPLE G3 | 0.1 | 0.1 | 0.25 |
| SAMPLE G4 | 0.1 | 0.05 | 0.24 |
| SAMPLE G5 | 0.1 | 0.0 | 0.3 |

FIG. 12

| SAMPLE NAME | SOLVENT | DISSOLUTION OF LITHIUM METAL |
|---|---|---|
| SAMPLE S-A1 | TETRAHYDROFURAN | ○ |
| SAMPLE S-A2 | 2-METHYLTETRAHYDROFURAN | ○ |
| SAMPLE S-A3 | 1,2-DIMETHOXYETHANE | ○ |
| SAMPLE S-A4 | 2,5-DIMETHYLTETRAHYDROFURAN | ○ |
| SAMPLE S-A5 | DIETHOXYETHANE | ○ |
| SAMPLE S-A6 | DIBUTOXYETHANE | ○ |
| SAMPLE S-A7 | DIETHYLENE GLYCOL DIMETHYL ETHER | ○ |
| SAMPLE S-A8 | TRIETHYLENE GLYCOL DIMETHYL ETHER | ○ |
| SAMPLE S-A9 | TETRAETHYLENE GLYCOL DIMETHYL ETHER | ○ |
| SAMPLE S-A10 | DIETHYLENE GLYCOL ETHYL METHYL ETHER | ○ |
| SAMPLE S-A11 | 3-METHYL-SULFOLANE | ○ |
| SAMPLE S-A12 | TETRAHYDROFURFURYLAMINE | ○ |
| SAMPLE S-A13 | 2-METHYLTETRAHYDROFURAN-3-ONE | × |
| SAMPLE S-A14 | TETRAHYDROFURFURYL BUTYRATE | × |
| SAMPLE S-A15 | DIPHENYL ETHER | × |
| SAMPLE S-A16 | VINYLENE CARBONATE | × |
| SAMPLE S-A17 | DIBUTOXYMETHANE | × |
| SAMPLE S-A18 | ANISOLE | × |
| SAMPLE S-A19 | PHENETOLE | × |
| SAMPLE S-A20 | 2,5-DIMETHOXYTETRAHYDROFURAN | × |

FIG. 13

| SAMPLE NAME | SOLVENT X | SOLVENT Y | VOLUME MIXING RATIO (X:Y) | DISSOLUTION OF LITHIUM METAL |
|---|---|---|---|---|
| SAMPLE S-B1 | DIBUTOXYETHANE | 2-METHYLTETRAHYDROFURAN | 3 : 7 | ◯ |
| SAMPLE S-B2 | DIBUTOXYETHANE | 2-METHYLTETRAHYDROFURAN | 2 : 8 | ◯ |
| SAMPLE S-B3 | DIBUTOXYETHANE | 2,5-DIMETHOXYTETRAHYDROFURAN | 3 : 7 | ◯ |
| SAMPLE S-B4 | DIBUTOXYETHANE | 2,5-DIMETHOXYTETRAHYDROFURAN | 2 : 8 | ◯ |
| SAMPLE S-B5 | DIBUTOXYMETHANE | DIBUTOXYETHANE | 2 : 8 | ◯ |
| SAMPLE S-B6 | ANISOLE | DIBUTOXYETHANE | 2 : 8 | ◯ |
| SAMPLE S-B7 | PHENETOLE | DIBUTOXYETHANE | 2 : 8 | ◯ |
| SAMPLE S-B8 | 2,5-DIMETHOXYTETRAHYDROFURAN | DIETHYLENE GLYCOL DIBUTYL ETHER | 2 : 8 | ◯ |
| SAMPLE S-B9 | 3-METHYLSULFOLANE | DIETHYLENE GLYCOL DIBUTYL ETHER | 2 : 8 | ◯ |

FLOW BATTERY

BACKGROUND

1. Technical Field

The present disclosure relates to a flow battery.

2. Description of the Related Art

Japanese Patent No. 5417441 discloses a redox flow battery that uses a negative electrode slurry solution containing a non-aqueous solvent and metal particles serving as solid negative electrode active material particles.

SUMMARY

There is a need in the related art to provide a high-energy density flow battery.

In one general aspect, the techniques disclosed here feature a flow battery including: a first liquid containing dissolved therein a condensed aromatic compound and lithium; a first electrode immersed in the first liquid; and a first circulator including a first container and a first passage prevention member. The first liquid containing the condensed aromatic compound dissolved therein has the property of causing the lithium to release solvated electrons and dissolve as cations. When the lithium dissolved in the first liquid precipitates on the first electrode, lithium precipitate particles are generated. The first circulator circulates the first liquid between the first electrode and the first container. The first circulator transfers the lithium precipitate particles generated on the first electrode to the first container, and the first passage prevention member is disposed in a channel through which the first liquid flows from the first container to the first electrode. The first passage prevention member prevents passage of the lithium precipitate particles.

The present disclosure can provide a high-energy density flow battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a table showing the results of measurement of the potentials of biphenyl solutions;

FIG. 6 is a table showing the results of measurement of the potentials of biphenyl solutions;

FIG. 7 is a table showing the results of measurement of the potentials of biphenyl solutions;

FIG. 8 is a table showing the results of measurement of the potentials of biphenyl solutions;

FIG. 9 is a table showing the results of measurement of the potentials of trans-stilbene solutions;

FIG. 10 is a table showing the results of measurement of the potentials of biphenyl solutions;

FIG. 11 is a table showing the results of measurement of the potentials of trans-stilbene solutions;

FIG. 12 is a table showing samples of a first liquid; and

FIG. 13 is a table showing other samples of the first liquid.

DETAILED DESCRIPTION

Embodiments of the present disclosure will next be described with reference to the drawings.

Embodiment 1

Figure 1:
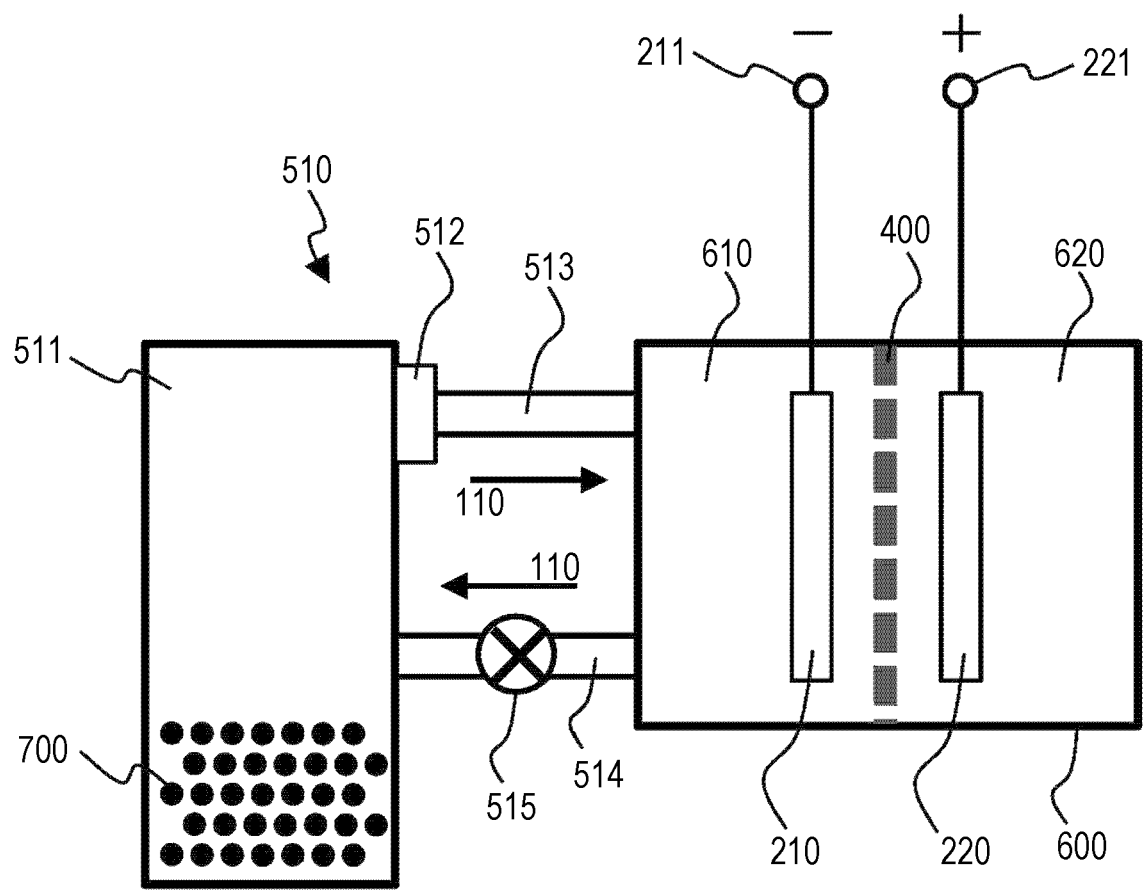
FIG. 1 is a block diagram showing a general structure of a flow battery in embodiment 1.

FIG. 1 is a block diagram showing a general structure of a flow battery 1000 in embodiment 1.

The flow battery 1000 in embodiment 1 includes a first liquid 110, a first electrode 210, and a first circulator 510.

The first liquid 110 contains dissolved therein a condensed aromatic compound and lithium.

The first electrode 210 is immersed in the first liquid 110.

The first circulator 510 includes a first container 511 and a first passage prevention member 512.

The first liquid 110 containing the condensed aromatic compound dissolved therein has the property of causing lithium to release solvated electrons and dissolve as cations.

When lithium dissolved in the first liquid 110 precipitates on the first electrode 210, lithium precipitate particles 700 are generated.

The first circulator 510 circulates the first liquid 110 between the first electrode 210 and the first container 511.

The first circulator 510 transfers the lithium precipitate particles 700 generated on the first electrode 210 to the first container 511.

The first passage prevention member 512 is disposed in a channel through which the first liquid 110 flows from the first container 511 to the first electrode 210 (a pipe 513 in the example shown in FIG. 1).

The first passage prevention member 512 prevents passage of the lithium precipitate particles 700.

The flow battery configured as above can have both a high energy density and a long cycle life.

Specifically, in the above structure, lithium can be present on the counter electrode side of the first electrode 210 in an amount exceeding the maximum amount dissolvable in the first liquid 110 containing the condensed aromatic compound dissolved therein. Since the lithium dissolved in the first liquid 110 and the lithium precipitate particles 700 are present, the amount of lithium is large, so that a high capacity density can be achieved. Therefore, a high energy density and a high capacity can be achieved.

In the above structure, the lithium precipitate particles 700 themselves are not circulated through the channel through which the first liquid 110 flows from the first container 511 to the first electrode 210, but only the first liquid 110 containing lithium dissolved therein can be circulated. This can prevent the occurrence of, for example, clogging of pipes etc. with the lithium precipitate particles 700. Therefore, the flow battery provided can have a long cycle life.

With the above structure, a material having a relatively low equilibrium potential (vs. Li/Li$^+$) can be used as the condensed aromatic compound. This allows the flow battery negative electrode provided to have a lower potential. Therefore, the flow battery provided can have a high battery voltage (discharge voltage).

During charging of the flow battery 1000 in embodiment 1, (i.e., in a state in which electrons are supplied to the first electrode 210 from the outside of the flow battery 1000), the condensed aromatic compound may be reduced on the first electrode 210, and lithium dissolved in the first liquid 110 may precipitate on the first electrode 210 and form lithium precipitate particles 700.

During discharging of the flow battery 1000 (i.e., in a state in which electrons are emitted from the first electrode 210 to the outside of the flow battery 1000), the condensed aromatic compound may be oxidized on the first electrode 210, and the lithium precipitate particles 700 may dissolve in the first liquid 110 as lithium.

With the above structure, a larger amount of lithium precipitate particles 700 can be generated during charging. Moreover, a large amount of lithium precipitate particles 700 can be used as a lithium source during discharging. This can increase the charge-discharge capacity.

For example, when the first liquid 110 comes into contact with the first electrode 210, the condensed aromatic compound is oxidized or reduced on the first electrode 210.

In the flow battery 1000 in embodiment 1, the condensed aromatic compound may be at least one selected from the group consisting of phenanthrene, biphenyl, o-terphenyl, trans-stilbene, triphenylene, and anthracene.

With the above structure, the condensed aromatic compound dissolved in the first liquid 110 provided can be electrochemically base. A solution containing the condensed aromatic compound (e.g., an ether solution) has the ability to dissolve lithium (e.g., lithium metal). Lithium easily releases electrons to form cations. Therefore, lithium donates electrons to the condensed aromatic compound in the solution and dissolves in the solution as cations. In this case, the condensed aromatic compound that has accepted the electrons solvates the electrons. The condensed aromatic compound solvating the electrons behaves as anions. Therefore, the condensed aromatic compound-containing solution itself has ion conductivity. In the condensed aromatic compound-containing solution, Li cations and electrons are present in equivalent amounts. Therefore, the condensed aromatic compound-containing solution itself can have strong reducing properties (in other words, can be electrochemically base).

For example, when an electrode that does not react with lithium is immersed in the first liquid 110 containing the condensed aromatic compound dissolved therein and then the potential with respect to lithium metal is measured, the potential measured is considerably low. The potential observed depends on the degree of solvation of electrons by the condensed aromatic compound (i.e., the type of condensed aromatic compound). Examples of the condensed aromatic compound that exhibits a low potential include phenanthrene, biphenyl, o-terphenyl, trans-stilbene, triphenylene, and anthracene.

Figure 2:
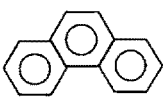
FIG. 2 is a table showing the results of measurement of the potentials of condensed aromatic compounds.
Figure 2:
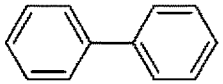
Figure 2:
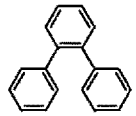
Figure 2:
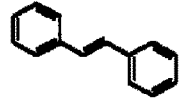
Figure 2:
Figure 2:
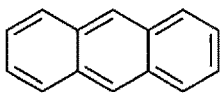

FIG. 2 is a table showing the results of measurement of the potentials of condensed aromatic compounds.

A 2×2 cm copper foil was wrapped with a polypropylene-made microporous separator, and the entire separator was wrapped with a large amount of lithium metal foil. A tab was attached to each of the copper foil and the lithium metal. Then a laminate exterior package was attached to the above product. 2MeTHF containing dissolved therein a condensed aromatic compound at a molar concentration (M) shown in FIG. 2 was poured into the laminate exterior package, and the laminate exterior package was hermetically heat-sealed. A potential measurement cell was thereby prepared for each condensed aromatic compound. FIG. 2 shows the potentials (V vs. Li/Li$^+$) measured with respect to lithium metal using these potential measurement cells.

In the flow battery 1000 in embodiment 1, the first liquid 110 may be an ether solution.

In the above structure, the first liquid 110 provided may be an electrolyte solution containing the condensed aromatic compound. Specifically, since the solvent for the condensed aromatic compound is an ether with no electron conductivity, the ether solution itself can have the properties of an electrolyte solution.

The ether used may be at least one of a commonly known cyclic ether and a commonly known chain ether. Tetrahydrofuran (THF), dioxane (DO), 2-methyltetrahydrofuran (2MeTHF), and 4-methyldioxane (4MeDO), etc. may be used as the cyclic ether. Glyme etc. may be used as the chain ether.

In the example in FIG. 1, the first electrode 210 is shown as a negative electrode, and a second electrode 220 is shown as a positive electrode.

When an electrode with a low relative potential is used as the second electrode 220, the first electrode 210 can serve as a positive electrode.

Specifically, the first electrode 210 may be a positive electrode, and the second electrode 220 may be a negative electrode.

The first electrode 210 may have a surface serving as a reaction field for the condensed aromatic compound.

In this case, a material stable in the first liquid 110 may be used for the first electrode 210. The material used for the first electrode 210 may be stable during an electrode reaction, which is an electrochemical reaction. For example, a metal (such as stainless steel, iron, copper, or nickel), carbon, etc. may be used for the first electrode 210.

The first electrode 210 may have a structure with an increased surface area (e.g., a mesh, a nonwoven fabric, a surface roughened plate, or a sintered porous body). In this case, the first electrode 210 has a large specific surface area. This can facilitate the progress of the oxidation or reduction reaction of the condensed aromatic compound.

The second electrode 220 may have a structure including a current collector and an active material disposed on the current collector. In this case, for example, a high-capacity active material can be used. A compound having the property of reversibly occluding and releasing lithium ions may be used as the active material for the second electrode 220.

Alternatively, the second electrode 220 may be lithium metal. When lithium metal is used for the second electrode 220, dissolution and precipitation of the metal serving as the positive electrode can be easily controlled, and a high capacity can be achieved.

The flow battery 1000 in embodiment 1 may further include a separator 400.

The separator 400 separates the first electrode 210 and the first liquid 110 from the second electrode 220.

The separator 400 may be a microporous membrane (porous body) used for known secondary batteries.

Alternatively, the separator 400 may be a porous membrane such as glass paper, which is a nonwoven fabric including glass fibers woven thereinto.

Alternatively, the separator 400 may be a separation membrane having ion conductivity (lithium ion conductivity). For example, the separator 400 may be an ion exchange resin membrane (such as a cation exchange membrane or an anion exchange membrane), a solid electrolyte membrane, etc.

The first circulator 510 may be a mechanism including, for example, a pipe, a tank, a pump, a valve, etc.

In embodiment 1, the first container 511 may be, for example, a tank.

The first container 511 may contain the first liquid 110 containing the condensed aromatic compound dissolved therein.

As shown in FIG. 1, the flow battery 1000 in embodiment 1 may further include an electrochemical reaction section 600, a positive electrode terminal 221, and a negative electrode terminal 211.

The electrochemical reaction section 600 is separated by the separator 400 into a negative electrode chamber 610 and a positive electrode chamber 620.

An electrode serving as the negative electrode (the first electrode 210 in the example shown in FIG. 1) is disposed in the negative electrode chamber 610.

The negative electrode terminal 211 is connected to the electrode serving as the negative electrode.

An electrode serving as the positive electrode (the second electrode 220 in the example shown in FIG. 1) is disposed in the positive electrode chamber 620.

The positive electrode terminal 221 is connected to the electrode serving as the positive electrode.

The negative electrode terminal 211 and the positive electrode terminal 221 are connected to, for example, a charge-discharge device. The charge-discharge device applies a voltage between the negative electrode terminal 211 and the positive electrode terminal 221 or collects electric power through the negative electrode terminal 211 and the positive electrode terminal 221.

As shown in FIG. 1, in the flow battery 1000 in embodiment 1, the first circulator 510 may include a pipe 514, a pipe 513, and a pump 515.

One end of the pipe 514 is connected to the negative electrode chamber 610 or the positive electrode chamber 620, whichever includes the first electrode 210 disposed therein (the negative electrode chamber 610 in the example shown in FIG. 1).

The other end of the pipe 514 is connected to an inlet of the first liquid 110 that is disposed in the first container 511.

One end of the pipe 513 is connected to an outlet of the first liquid 110 that is disposed in the first container 511.

The other end of the pipe 513 is connected to the negative electrode chamber 610 or the positive electrode chamber 620, whichever includes the first electrode 210 disposed therein (the negative electrode chamber 610 in the example shown in FIG. 1).

The pump 515 is disposed, for example, in the pipe 514. Alternatively, the pump 515 may be disposed in the pipe 513.

The first passage prevention member 512 may be disposed, for example, at the joint between the first container 511 and the pipe 513.

In the flow battery 1000 in embodiment 1, the first passage prevention member 512 may be a filter that can filter out the lithium precipitate particles 700.

In this case, the filter may be formed of, for example, a glass fiber paper filter, a polypropylene nonwoven fabric, a polyethylene nonwoven fabric, or a metal mesh unreactive with lithium.

In the above structure, the lithium precipitate particles 700 are further prevented from flowing into the first electrode 210 side. This can further prevent clogging of a component (e.g., a pipe) of the first circulator 510 with the lithium precipitate particles 700.

The filter may be a member having pores smaller than a prescribed diameter (e.g., a particle diameter causing clogging) of the lithium precipitate particles 700. The material used for the filter may be a material unreactive with the lithium precipitate particles 700, the first liquid 110, etc.

With the above structure, even when the lithium precipitate particles 700 flow together with the first liquid 110 within the first container 511, the lithium precipitate particles 700 are prevented from flowing out of the first container 511.

In the example shown in FIG. 1, the first liquid 110 contained in the first container 511 passes through the first passage prevention member 512 and the pipe 513 and is then supplied to the negative electrode chamber 610.

The condensed aromatic compound dissolved in the first liquid 110 is thereby oxidized or reduced on the first electrode 210.

Then the first liquid 110 containing dissolved therein the condensed aromatic compound that has been oxidized or reduced passes through the pipe 514 and the pump 515 and is supplied to the first container 511.

For example, the pump 515 may be used to control the circulation of the first liquid 110. Specifically, the pump 515 may be used appropriately to start the supply of the first liquid 110, stop the supply, or control the amount of the supply.

Alternatively, a mechanism (e.g., a valve) different from the pump 515 may be used to control the circulation of the first liquid 110.

Electrolyte solutions (solvents) used in the negative electrode chamber 610 and the positive electrode chamber 620 separated by the separator 400 may have different compositions.

Alternatively, the electrolyte solutions (solvents) used in the positive electrode chamber 620 and the negative electrode chamber 610 may have the same composition <Description of Charge and Discharge Processes>

Charge and discharge processes of the flow battery 1000 in embodiment 1 will next be described.

The charge and discharge processes will be specifically described while the following operation example is shown.

Specifically, in this operation example, the first electrode 210 is a negative electrode and is made of stainless steel.

In this operation example, the first liquid 110 is an ether solution containing dissolved therein the condensed aromatic compound.

In this operation example, the condensed aromatic compound is phenanthrene (hereinafter denoted by PNT).

In this operation example, the second electrode 220 is a positive electrode and includes a current collector (stainless steel) and lithium iron phosphate ($LiFePO_4$) used as an active material disposed on the current collector.

In this operation example, lithium is present on the positive electrode side in an amount exceeding the maximum amount of lithium dissolvable in the first liquid 110 (the ether solution containing the condensed aromatic compound dissolved therein). The battery is designed such that this lithium amount controls the battery capacity.

[Description of Charge Process]

First, the charge reaction will be described.

A voltage is applied between the first electrode 210 and the second electrode 220 to perform charging.

(Reaction on Positive Electrode Side)

On the second electrode 220 serving as the positive electrode, the oxidation reaction of the positive electrode active material occurs when a voltage is applied. Specifically, lithium ions are released from the positive electrode active material. Electrons are thereby emitted from the second electrode 220 to the outside of the flow battery.

For example, in this operation example, the following reaction occurs.

$$LiFePO_4 \rightarrow FePO_4 + Li^+ + e^-$$

Part of the lithium ions (Li$^+$) generated can migrate to the first liquid 110 through the separator 400.

When the battery assembled is in a discharged state, lithium is present on the positive electrode side. When the positive electrode is oxidized as described above, the lithium extracted migrates to the negative electrode side through the separator.

(Reaction on Negative Electrode Side)

When a voltage is applied, electrons are supplied from the outside of the flow battery to the first electrode 210 serving as the negative electrode. Lithium ions receive electrons on the first electrode 210 and become lithium atoms.

For example, in this operation example, the following reaction occurs.

$$Li^+ + e^- \rightarrow Li$$

However, the lithium atoms dissolve in the first liquid 110 present therearound. Specifically, the reduction reaction of the condensed aromatic compound occurs on the first electrode 210.

For example, in this operation example, the following reactions occur.

$$Li \rightarrow Li^+ + e^-$$

$$PNT + Li^+ + e^- \rightarrow PNT \cdot Li$$

As the charging proceeds further, the concentration of lithium in the first liquid 110 reaches a saturated state. In this saturated state, the lithium formed cannot dissolve in the first liquid 110. Therefore, the lithium formed in the saturated state precipitates on the first electrode 210 as lithium precipitate particles 700.

For example, in this operation example, the following reaction occurs.

$$Li^+ + e^- \rightarrow Li$$

The lithium precipitate particles 700 precipitated on the first electrode 210 are transferred (supplied) through the first circulator 510 to the first container 511.

Specifically, a flow is always present around the first electrode 210. Therefore, the lithium precipitate particles 700 formed migrate with the flow and are transferred to the first container 511.

The lithium precipitate particles 700 transferred to the first container 511 are urged to flow from the first container 511 again to the first electrode 210 side with the flow. However, the lithium precipitate particles 700 are trapped by the first passage prevention member 512 disposed at the outlet of the first container 511. Therefore, the lithium precipitate particles 700 are not transferred to the first electrode 210 side. The lithium precipitate particles 700 are stored in the first container 511.

The above charge reaction may proceed until the positive electrode active material reaches its fully charged state.

[Description of Discharge Process]

Next, a discharge reaction from full charge will be described.

In the full charge, the positive electrode active material is in its charged state.

During the discharge reaction, electric power is outputted through the first electrode 210 and the second electrode 220.

(Reaction on Positive Electrode Side)

During discharging of the battery, electrons are supplied from the outside of the flow battery to the second electrode 220 serving as the positive electrode. The reduction reaction of the active material thereby occurs on the second electrode 220.

For example, in this operation example, the following reaction occurs.

$$FePO_4 + Li^+ + e^- \rightarrow LiFePO_4$$

Part of the lithium ions (Li$^+$) may be supplied from the first liquid 110 through the separator 400.

(Reaction on Negative Electrode Side)

During discharging of the battery, the oxidation reaction of the condensed aromatic compound occurs on the first electrode 210 serving as the negative electrode. Electrons are thereby emitted from the first electrode 210 to the outside of the flow battery.

For example, in this operation example, the following reaction occurs.

$$PNT \cdot Li \rightarrow PNT + Li^+ + e^-$$

Specifically, during discharging, lithium dissolved in the first liquid 110 releases electrons. The amount of lithium dissolved in the first liquid 110 thereby decreases.

The condensed aromatic compound oxidized on the first electrode 210 is transferred (supplied) through the first circulator 510 to the first container 511.

The lithium precipitate particles 700 stored in the first container 511 dissolve in the first liquid 110 containing the condensed aromatic compound dissolved therein and oxidized on the first electrode 210. Specifically, in the first container 511, the reduction reaction of the condensed aromatic compound occurs.

For example, in this operation example, the following reactions occur.

$$Li \rightarrow Li^+ + e^-$$

$$PNT + Li^+ + e^- \rightarrow PNT \cdot Li$$

As described above, the lithium precipitate particles 700 are excessively present in the first container 511. Therefore, even when the amount of lithium in the first liquid 110 is decreased on the first electrode 210, the decrease in the amount of lithium is immediately compensated by dissolution of the lithium precipitate particles 700 stored in the first container 511 in the first liquid 110.

The condensed aromatic compound reduced in the first container 511 is transferred (supplied) through the first circulator 510 to a position in which the first electrode 210 is disposed. This causes the oxidation reaction of the condensed aromatic compound to occur again.

For example, in this operation example, the following reaction occurs.

$$PNT \cdot Li \rightarrow PNT + Li^+ + e^-$$

As described above, the amount of lithium in the first liquid 110 is always maintained in the saturated state until the late stage of discharging. This allows stable discharging.

The above discharge reaction may proceed until the positive electrode active material reaches its fully discharged state.

Embodiment 2

Embodiment 2 will be described. However, the description will be omitted as appropriate when it overlaps with that of embodiment 1 above.

In a structure shown in embodiment 2, electrolyte solutions circulate on both the first electrode side and the second electrode side.

Figure 3:
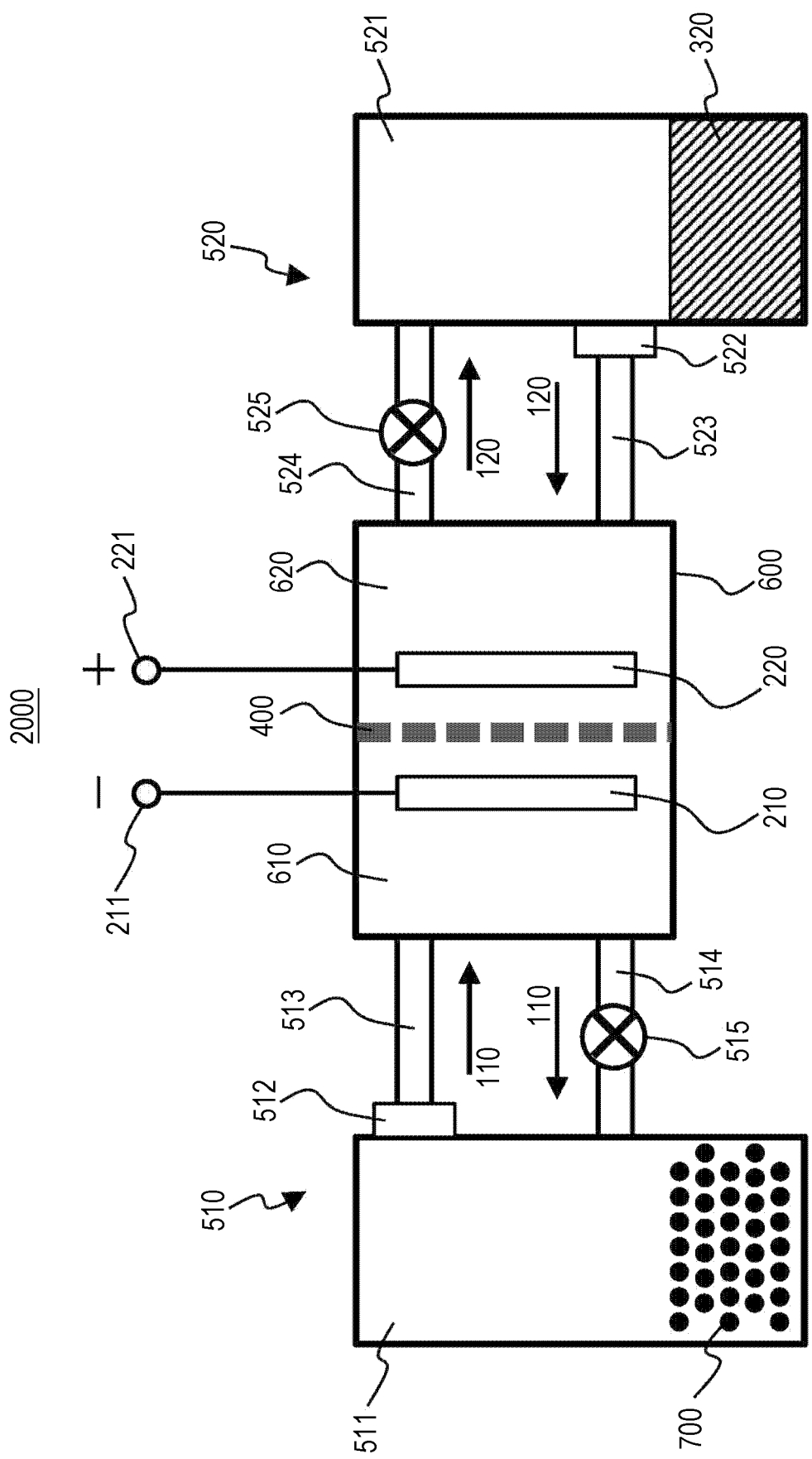
FIG. 3 is a block diagram showing a general structure of a flow battery in embodiment 2.

FIG. 3 is a block diagram showing a general structure of a flow battery 2000 in embodiment 2.

The flow battery 2000 in embodiment 2 includes, in addition to the structure of the flow battery 1000 in embodiment 1, the following structure.

Specifically, the flow battery 2000 in embodiment 2 further includes a second liquid 120, the second electrode 220, and a second active material 320.

The second liquid 120 contains a second electrode-side mediator 121 dissolved therein.

The second electrode 220 is a counter electrode of the first electrode 210. The second electrode 220 is immersed in the second liquid 120.

The second active material 320 is immersed in the second liquid 120.

The second electrode-side mediator 121 is oxidized and reduced on the second electrode 220.

The second electrode-side mediator 121 is oxidized and reduced by the second active material 320.

The flow battery configured as above can have both a higher energy density and a longer cycle life.

Specifically, in the flow battery configured as above, although the active materials are used, these active materials themselves are not circulated. Therefore, for example, a high-capacity powdery active material for charge and discharge reactions can be used as the second active material 320. This allows a higher energy density and a higher capacity to be achieved. The battery capacity is determined by "positive electrode capacity density×negative electrode capacity density/(positive electrode capacity density+negative electrode capacity density)." Therefore, when a mediator-type flow battery structure is used for each of the first electrode 210 side and the second electrode 220 side, the capacity densities can be significantly improved.

In the above structure, only the second liquid 120 containing the second electrode-side mediator 121 dissolved therein can be circulated without circulation of the powdery active material itself. This can prevent the occurrence of, for example, clogging of pipes with the powdery active material. Therefore, the flow battery provided can have a longer cycle life.

In the above structure, when the second active material 320 used is an active material having a relatively high equilibrium potential (vs. Li/Li$^+$) (e.g., lithium iron phosphate), a material having a relatively high equilibrium potential (vs. Li/Li$^+$) (e.g., tetrathiafulvalene) can be used as the second electrode-side mediator 121. In this case, the flow battery positive electrode provided can have a higher potential. Therefore, the flow battery provided can have a higher battery voltage (discharge voltage).

In the flow battery 2000 in embodiment 2, lithium may be dissolved in the second liquid 120.

The second active material 320 may be a material having the property of occluding and releasing lithium.

During charging of the flow battery 2000 (i.e., in a state in which electrons are supplied to the first electrode 210 from the outside of the flow battery 2000 and electrons are emitted from the second electrode 220 to the outside of the flow battery 2000), the second electrode-side mediator 121 may be oxidized on the second electrode 220. Then the second electrode-side mediator 121 oxidized on the second electrode 220 may be reduced by the second active material 320, and the second active material 320 may release lithium.

During discharging of the flow battery 2000 (i.e., in a state in which electrons are emitted from the first electrode 210 to the outside of the flow battery 2000 and electrons are supplied from the outside of the flow battery 2000 to the second electrode 220), the second electrode-side mediator 121 may be reduced on the second electrode 220. Then the second electrode-side mediator 121 reduced on the second electrode 220 may be oxidized by the second active material 320, and the second active material 320 may occlude lithium.

In the above structure, the second active material 320 used may be, for example, an active material having the property of reversibly occluding and releasing lithium (e.g., lithium ions). In this case, the material design of the second active material 320 is facilitated. Moreover, a higher capacity can be achieved.

For example, when the second liquid 120 comes into contact with the second electrode 220, the second electrode-side mediator 121 is oxidized or reduced on the second electrode 220.

For example, when the second liquid 120 comes into contact with the second active material 320, the second electrode-side mediator 121 is oxidized or reduced by the second active material 320.

In the flow battery 2000 in embodiment 2, the redox potential range of the second electrode-side mediator 121 and the redox potential range of the second active material 320 may overlap each other.

In the above structure, the second active material 320 can oxidize and reduce the second electrode-side mediator 121.

In the flow battery 2000 in embodiment 2, the upper limit of the redox potential range of the second electrode-side mediator 121 may be higher than the upper limit of the redox potential range of the second active material 320.

In this case, the lower limit of the redox potential range of the second electrode-side mediator 121 may be lower than the lower limit of the redox potential range of the second active material 320.

With the above structure, the capacity of the second active material 320 can be sufficiently utilized (e.g., up to nearly 100%). Therefore, the flow battery provided can have a higher capacity.

One redox species having a plurality of redox potentials may be used as the second electrode-side mediator 121.

Alternatively, a mixture of a plurality of redox species each having a constant redox potential may be used as the second electrode-side mediator 121.

In the flow battery 2000 in embodiment 2, the second electrode-side mediator 121 may be an organic compound having oxidizing and reducing properties.

With the above structure, the solubility of the second electrode-side mediator 121 in the second liquid 120 (e.g., a nonaqueous solvent) can be increased.

In the flow battery 2000 in embodiment 2, the second electrode-side mediator 121 may be an organic compound having multiple redox potentials (e.g., two or more redox potentials).

Examples of such an organic compound capable of multi-stage redox include organic compounds having π conjugated electron clouds such as tetrathiafulvalene derivatives, quinone derivatives, and TCNQ.

In the flow battery 2000 in embodiment 2, the second electrode-side mediator 121 may be tetrathiafulvalene.

With the above structure, the second electrode-side mediator 121 provided can have relatively high two redox potentials (a lower limit of about 3.4 V and an upper limit of about 3.7 V versus the lithium reference potential). The flow battery positive electrode provided can thereby have a higher potential. Therefore, the flow battery provided can have a high battery voltage (discharge voltage).

In the flow battery 2000 in embodiment 2, the second active material 320 may be a material having the property of reversibly occluding and releasing lithium ions. For example, the second active material 320 used may be a commonly known active material for secondary batteries (such as a transition metal oxide, a fluoride, polyanions, fluorinated polyanions, or a transition metal sulfide).

In the flow battery 2000 in embodiment 2, the second active material 320 may be lithium iron phosphate.

In the above structure, the second active material 320 can have a relatively high equilibrium potential (vs. Li/Li$^+$). Therefore, a material having a relatively high equilibrium potential (vs. Li/Li$^+$) (e.g., tetrathiafulvalene) can be used as the second electrode-side mediator 121. The flow battery positive electrode provided can thereby have a higher potential. Therefore, the flow battery provided can have a high battery voltage (discharge voltage).

A compound containing iron, manganese, or lithium (such as LiFePO$_4$ or LiMnO$_2$) and a vanadium-containing compound (such as V$_2$O$_5$) have a redox potential of 3.2 V to 3.7 V with respect to lithium. Therefore, when LiFePO$_4$, for example, is used as the second active material 320, tetrathiafulvalene may be used as the second electrode-side mediator 121.

In the flow battery 2000 in embodiment 2, the second electrode-side mediator 121 may be a quinone derivative. The quinone derivative has multiple redox potentials of, for example, 1 V to 3 V with respect to lithium. In this case, a material having a redox potential of 1 V to 3 V with respect to lithium may be used as the second active material 320. Examples of the material having a redox potential of 1 V to 3 V with respect to lithium include compounds containing titanium, niobium, or lithium (such as Li$_4$Ti$_5$O$_{12}$ and LiNbO$_3$).

In the flow battery 2000 in embodiment 2, the second electrode-side mediator 121 may be metal-containing ions. Examples of the metal-containing ions include vanadium ions, manganese ions, and molybdenum ions that have multiple redox potentials. For example, vanadium ions have a variety of reaction stages (divalence and trivalence, trivalence and tetravalence, and tetravalence and pentavalence).

The second active material 320 used may be a powdery active material. By charging a tank with the second active material 320 in unprocessed powder form, production can be simplified, and the production cost can be reduced.

Alternatively, the second active material 320 used may be a pellet-like active material (prepared, for example, by forming a powder into pellets). By charging the tank with the second active material 320 in pellet form, the production can be simplified, and the production cost can be reduced.

Alternatively, the second active material 320 used may be an active material pelleted using a commonly known binder (such as polyvinylidene fluoride, polypropylene, polyethylene, or polyimide).

The second active material 320 used may be an active material in the form of a film fixed to a metal foil.

Alternatively, the second active material 320 used may be an active material mixed with a commonly known conductive assistant (such as carbon black or polyaniline) or an ion conductor (such as polymethyl methacrylate or polyethylene oxide).

The second active material 320 may be a material that does not dissolve (i.e., is insoluble) in the second liquid 120. In the flow battery provided in this case, the second electrode-side mediator 121 is circulated together with the second liquid 120, but the second active material 320 is not circulated.

The second liquid 120 may be, for example, a commonly known nonaqueous electrolyte solution for secondary batteries. In this case, the nonaqueous electrolyte solution is composed, for example, of a commonly known electrolyte salt (such as an electrolyte salt of a lithium ion and an anion) and a nonaqueous solvent containing the electrolyte salt dissolved therein.

The nonaqueous solvent used may be a commonly known nonaqueous solvent for secondary batteries. Specifically, the nonaqueous solvent used may be a cyclic or chain carbonate, a cyclic or chain ester, a cyclic or chain ether, a nitrile, a cyclic or chain sulfone, or a cyclic or chain sulfoxide.

Different solvents may be used for the first liquid 110 and the second liquid 120, or the same solvent may be used.

In the example in FIG. 3, the first electrode 210 is shown as a negative electrode, and the second electrode 220 is shown as a positive electrode.

When an electrode with a low-relative potential is used as the second electrode 220, the first electrode 210 can server as a positive electrode.

Specifically, the first electrode 210 may be a positive electrode, and the second electrode 220 may be a negative electrode.

The second electrode 220 may have a surface serving as a reaction field for the second electrode-side mediator 121.

In this case, a material stable in the solvent for the second liquid 120 and the supporting electrolyte therefor may be used for the second electrode 220. The material used for the second electrode 220 may be stable during an electrode reaction, which is an electrochemical reaction. For example, a metal (such as stainless steel, iron, copper, or nickel), carbon, etc. may be used for the second electrode 220.

The second electrode 220 may have a structure with an increased surface area (e.g., a mesh, a nonwoven fabric, a surface roughened plate, or a sintered porous body). In this case, the second electrode 220 has a large specific surface area. This can facilitate the progress of the oxidation or reduction reaction of the second electrode-side mediator 121.

Different electrode materials may be used for the first electrode 210 and the second electrode 220, or the same electrode material may be used.

The flow battery 2000 in embodiment 2 may further include the separator 400.

The separator 400 separates the first electrode 210 and the first liquid 110 from the second electrode 220 and the second liquid 120.

The separator 400 used may have the structure shown in embodiment 1 above.

The flow battery 2000 in embodiment 2 may further include a second circulator 520.

The second circulator 520 is a mechanism that circulates the second liquid 120 between the second electrode 220 and the second active material 320.

With the above structure, the second electrode-side mediator 121 can be circulated together with the second liquid 120 between the second electrode 220 and the second active material 320. This allows the oxidation and reduction reactions of materials to proceed more efficiently.

The second circulator 520 may be a mechanism including, for example, a pipe, a tank, a pump, a valve, etc.

In the flow battery 2000 in embodiment 2, the second circulator 520 may include a second container 521.

The second active material 320 and the second liquid 120 may be contained in the second container 521.

The second circulator 520 may circulate the second liquid 120 between the second electrode 220 and the second container 521.

In the second container 521, the second active material 320 may come into contact with the second liquid 120. This allows the second electrode-side mediator 121 to be oxidized and reduced by the second active material 320.

In the above structure, the second liquid 120 and the second active material 320 can come into contact with each other in the second container 521. In this case, for example, the area of contact between the second liquid 120 and the second active material 320 can be increased. Moreover, the time of contact between the second liquid 120 and the second active material 320 can be increased. This allows the oxidation and reduction reactions of the second electrode-side mediator 121 by the second active material 320 to proceed more efficiently.

In embodiment 2, the second container 521 may be, for example, a tank.

In the second container 521, the second liquid 120 containing the second electrode-side mediator 121 dissolved therein may be accommodated, for example, in spaces in the second active material 320 placed in the second container 521.

As shown in FIG. 3, in the flow battery 2000 in embodiment 2, the second circulator 520 may include a pipe 523, a pipe 524, and a pump 525.

One end of the pipe 524 is connected to the positive electrode chamber 620 or the negative electrode chamber 610, whichever includes the second electrode 220 disposed therein (the positive electrode chamber 620 in the example shown in FIG. 3).

The other end of the pipe 524 is connected to an inlet of the second liquid 120 that is disposed in the second container 521.

One end of the pipe 523 is connected to an outlet of the second liquid 120 that is disposed in the second container 521.

The other end of the pipe 523 is connected to the positive electrode chamber 620 or the negative electrode chamber 610, whichever includes the second electrode 220 disposed therein (the positive electrode chamber 620 in the example shown in FIG. 3).

The pump 525 is disposed, for example, in the pipe 524. Alternatively, the pump 525 may be disposed in the pipe 523.

In the flow battery 2000 in embodiment 2, the second circulator 520 may include a second passage prevention member 522.

The second passage prevention member 522 prevents passage of the second active material 320.

The second passage prevention member 522 is disposed in a channel through which the second liquid 120 flows from the second container 521 to the second electrode 220 (the pipe 523 in the example shown in FIG. 3).

The above structure can prevent the second active material 320 from flowing out of the second container 521 (e.g., flowing into the second electrode 220 side). Specifically, the second active material 320 stays in the second container 521. Therefore, the flow battery provided can have a structure in which the second active material 320 itself is not circulated. This can prevent clogging of a component (e.g., a pipe) of the second circulator 520 with the second active material 320. Moreover, the occurrence of resistance loss caused by the second active material 320 flowing into the second electrode 220 side can be prevented.

The second passage prevention member 522 may be disposed, for example, at the joint between the second container 521 and the pipe 523.

The second passage prevention member 522 may be, for example, a filter that can filter out the second active material 320. In this case, the filter may be a member having pores smaller than the minimum diameter of the particles of the second active material 320. A material unreactive with the second active material 320, the second liquid 120, etc. can be used as the material of the filter. The filter may be, for example, a glass fiber paper filter, a polypropylene nonwoven fabric, a polyethylene nonwoven fabric, or a metal mesh unreactive with lithium metal.

With the above structure, even when the second active material 320 flows together with the second liquid 120 within the second container 521, the second active material 320 is prevented from flowing out of the second container 521.

In the example shown in FIG. 3, the second liquid 120 contained in the second container 521 passes through the second passage prevention member 522 and the pipe 523 and is then supplied to the positive electrode chamber 620.

The second electrode-side mediator 121 dissolved in the second liquid 120 is thereby oxidized or reduced on the second electrode 220.

Then the second liquid 120 containing the oxidized or reduced second electrode-side mediator 121 dissolved therein passes through the pipe 524 and the pump 525 and is supplied to the second container 521.

Then the second electrode-side mediator 121 dissolved in the second liquid 120 is oxidized or reduced by the second active material 320.

For example, the pump 525 may be used to control the circulation of the second liquid 120. Specifically, the pump 525 may be used appropriately to start the supply of the second liquid 120, stop the supply, or control the amount of the supply.

Alternatively, a mechanism (e.g., a valve) different from the pump 525 may be used to control the circulation of the second liquid 120.

<Description of Charge and Discharge Processes>

Charge and discharge processes of the flow battery 2000 in embodiment 2 will next be described.

The charge and discharge processes will be specifically described while the following operation example is shown.

Specifically, in this operation example, the first electrode 210 is a negative electrode and is made of stainless steel.

In this operation example, the first liquid 110 is an ether solution containing dissolved therein a condensed aromatic compound.

In this operation example, the condensed aromatic compound is phenanthrene (hereinafter denoted by PNT).

In this operation example, the second electrode 220 is a positive electrode and is made of stainless steel.

In this operation example, the second liquid 120 is an ether solution containing the second electrode-side mediator 121 dissolved therein.

In this operation example, the second electrode-side mediator 121 is tetrathiafulvalene (hereinafter denoted by TTF).

In this operation example, the second active material 320 is lithium iron phosphate ($LiFePO_4$).

In this operation example, the separator 400 is a lithium ion conductive solid electrolyte membrane.

In this operation example, lithium is present on the positive electrode side in an amount exceeding the maximum amount of lithium dissolvable in the first liquid 110

(the ether solution containing the condensed aromatic compound dissolved therein). The battery is designed such that this lithium amount controls the battery capacity.

[Description of Charge Process]

First, the charge reaction will be described.

A voltage is applied between the first electrode 210 and the second electrode 220 to perform charging.

(Reaction of Positive Electrode Side)

On the second electrode 220 serving as the positive electrode, the oxidation reaction of the second electrode-side mediator 121 occurs when a voltage is applied. Specifically, the second electrode-side mediator 121 is oxidized on the surface of the second electrode 220. Electrons are thereby emitted from the second electrode 220 to the outside of the flow battery.

For example, in this operation example, the following reactions occur.

$$TTF \rightarrow TTF^+ + e^-$$

$$TTF^+ \rightarrow TTF^{2+} + e^-$$

The second electrode-side mediator 121 oxidized on the second electrode 220 is transferred (supplied) through the second circulator 520 to a position in which the second active material 320 is disposed.

In this case, the second electrode-side mediator 121 oxidized on the second electrode 220 is reduced by the second active material 320. In other words, the second active material 320 is oxidized by the second electrode-side mediator 121. The second active material 320 thereby releases lithium.

For example, in this operation example, the following reaction occurs.

$$LiFePO_4 + TTF^{2+} \rightarrow FePO_4 + Li^+ + TTF^+$$

The second electrode-side mediator 121 reduced by the second active material 320 is transferred (supplied) through the second circulator 520 to a position in which the second electrode 220 is disposed.

In this case, the second electrode-side mediator 121 is oxidized on the surface of the second electrode 220.

For example, in this operation example, the following reaction occurs.

$$TTF^+ \rightarrow TTF^{2+} + e^-$$

Part of the lithium ions (Li$^+$) generated may be transferred to the first liquid 110 through the separator 400.

When the battery assembled is in a discharged state, lithium is present on the positive electrode side. When the positive electrode is oxidized as described above, the lithium extracted migrates to the negative electrode side through the separator.

As described above, the second electrode-side mediator 121 is unchanged in the overall reaction including circulation.

However, the second active material 320 located in the position spaced apart from the second electrode 220 is brought to a charged state.

In a fully charged state, TTF$^{2+}$ is present in the second liquid 120, and the second active material 320 is in the form of FePO$_4$. In this case, the charge potential is determined by the potential for oxidation to TTF$^{2+}$.

(Reaction of Negative Electrode Side)

When a voltage is applied, electrons are supplied from the outside of the flow battery to the first electrode 210 serving as the negative electrode. Lithium ions receive electrons on the first electrode 210 and become lithium atoms.

For example, in this operation example, the following reaction occurs.

$$Li^+ + e^- \rightarrow Li$$

However, the lithium atoms dissolve in the first liquid 110 present therearound. Specifically, the reduction reaction of the condensed aromatic compound occurs on the first electrode 210.

For example, in this operation example, the following reactions occur.

$$Li \rightarrow Li^+ + e^-$$

$$PNT + Li^+ + e^- \rightarrow PNT \cdot Li$$

As the charging proceeds further, the concentration of lithium in the first liquid 110 reaches a saturated state. In this saturated state, the lithium formed cannot dissolve in the first liquid 110. Therefore, the lithium formed in the saturated state precipitates on the first electrode 210 as lithium precipitate particles 700.

For example, in this operation example, the following reaction occurs.

$$Li^+ + e^- \rightarrow Li$$

The lithium precipitate particles 700 precipitated on the first electrode 210 are transferred (supplied) through the first circulator 510 to the first container 511.

Specifically, a flow is always present around the first electrode 210. Therefore, the lithium precipitate particles 700 migrate with the flow and are transferred to the first container 511.

The lithium precipitate particles 700 transferred to the first container 511 are urged to flow from the first container 511 again to the first electrode 210 with the flow. However, the lithium precipitate particles 700 are trapped by the first passage prevention member 512 disposed at the outlet of the first container 511. Therefore, the lithium precipitate particles 700 are not transferred to the first electrode 210 side. The lithium precipitate particles 700 are stored in the first container 511.

The above charge reaction may proceed until the second active material 320 reaches its fully charged state.

[Description of Discharge Process]

Next, a discharge reaction from full charge will be described.

In the full charge, the second active material 320 is in its charged state.

During the discharge reaction, electric power is outputted through the first electrode 210 and the second electrode 220.

(Reaction of Positive Electrode Side)

During discharging of the battery, electrons are supplied from the outside of the flow battery to the second electrode 220 serving as the positive electrode. The reduction reaction of the second electrode-side mediator 121 thereby occurs on the second electrode 220. Specifically, the second electrode-side mediator 121 is reduced on the second electrode 220.

For example, in this operation example, the following reactions occur.

$$TTF^{2+} + e^- \rightarrow TTF^+$$

$$TTF^+ + e^- \rightarrow TTF$$

The second electrode-side mediator 121 reduced on the second electrode 220 is transferred (supplied) through the second circulator 520 to the position in which the second active material 320 is disposed.

In this case, the second electrode-side mediator 121 reduced on the second electrode 220 is oxidized by the second active material 320. In other words, the second active material 320 is reduced by the second electrode-side mediator 121. The second active material 320 thereby occludes lithium.

For example, in this operation example, the following reaction occurs.

$$FePO_4 + Li^+ + TTF \rightarrow LiFePO_4 + TTF^+$$

The second electrode-side mediator 121 oxidized by the second active material 320 is transferred (supplied) through the second circulator 520 to the position in which the second electrode 220 is disposed.

In this case, the second electrode-side mediator 121 is reduced on the surface of the second electrode 220.

For example, in this operation example, the following reaction occurs.

$$TTF^+ + e^- \rightarrow TTF$$

Part of the lithium ions (Li$^+$) may be supplied from the first liquid 110 through the separator 400.

As described above, the second electrode-side mediator 121 is unchanged in the overall reaction including circulation.

However, the second active material 320 located in the position spaced apart from the second electrode 220 is brought to a discharged state.

In a fully discharged state, TTF is present in the second liquid 120, and the second active material 320 is in the form of LiFePO$_4$. In this case, the discharge potential is determined by the potential for reduction to TTF.

(Reaction of Negative Electrode Side)

During discharging of the battery, the oxidation reaction of the condensed aromatic compound occurs on the first electrode 210 serving as the negative electrode. Electrons are thereby emitted from the first electrode 210 to the outside of the flow battery.

For example, in this operation example, the following reaction occurs.

$$PNT \cdot Li \rightarrow PNT + Li^+ + e^-$$

Specifically, during discharging, lithium dissolved in the first liquid 110 releases electrons. The amount of lithium dissolved in the first liquid 110 thereby decreases.

The condensed aromatic compound oxidized on the first electrode 210 is transferred (supplied) through the first circulator 510 to the first container 511.

The lithium precipitate particles 700 stored in the first container 511 dissolve in the first liquid 110 containing the condensed aromatic compound dissolved therein and oxidized on the first electrode 210. Specifically, in the first container 511, the reduction reaction of the condensed aromatic compound occurs.

For example, in this operation example, the following reactions occur.

$$Li \rightarrow Li^+ + e^-$$

$$PNT + Li^+ + e^- \rightarrow PNT \cdot Li$$

As described above, the lithium precipitate particles 700 are excessively present in the first container 511. Therefore, even when the amount of lithium in the first liquid 110 is decreased on the first electrode 210, the decrease in the amount of lithium is immediately compensated by dissolution of the lithium precipitate particles 700 stored in the first container 511 in the first liquid 110.

The condensed aromatic compound reduced in the first container 511 is transferred (supplied) through the first circulator 510 to a position in which the first electrode 210 is disposed. This causes the oxidation reaction of the condensed aromatic compound to occur again.

For example, in this operation example, the following reaction occurs.

$$PNT \cdot Li \rightarrow PNT + Li^+ + e^-$$

As described above, the amount of lithium in the first liquid 110 is always maintained in the saturated state until the late stage of discharging. This allows stable discharging.

The above discharge reaction may proceed until the second active material 320 reaches its fully discharged state.

Embodiment 3

Embodiment 3 will be described. However, the description will be omitted as appropriate when it overlaps with that of embodiment 1 or 2 above.

Figure 4:
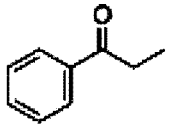
FIG. 4 is a table showing the results of measurement of the potentials of condensed aromatic compounds.
Figure 4:
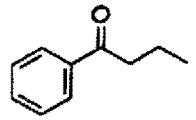
Figure 4:
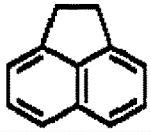
Figure 4:
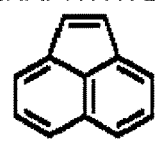
Figure 4:
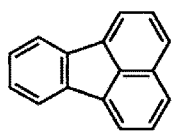
Figure 4:
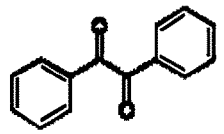

FIG. 4 is a table showing the results of measurement of the potentials of condensed aromatic compounds.

A 2×2 cm copper foil was wrapped with a polypropylene-made microporous separator, and the entire separator was wrapped with a large amount of lithium metal foil. A tab was attached to each of the copper foil and the lithium metal. Then a laminate exterior package was attached to the above product. 2MeTHF containing dissolved therein a condensed aromatic compound at a molar concentration (M) shown in FIG. 4 was poured into the laminate exterior package, and the laminate exterior package was hermetically heat-sealed. A potential measurement cell was thereby prepared for each condensed aromatic compound. FIG. 4 shows the potentials (V vs. Li/Li+) measured with respect to lithium metal using these potential measurement cells. In this measurement, the ether used was 2MeTHF, but other ethers can also be used.

A flow battery in embodiment 3 includes, in addition to the structure of the flow battery in embodiment 1 or 2, the following structure.

Specifically, in the flow battery in embodiment 3, the condensed aromatic compound is at least one selected from the group consisting of phenanthrene, biphenyl, o-terphenyl, trans-stilbene, triphenylene, anthracene, butyrophenone, valerophenone, acenaphthene, acenaphthylene, fluoranthene, and benzil.

In the above structure, the condensed aromatic compound dissolved in the first liquid 110 can be electrochemically base. A solution containing the condensed aromatic compound (e.g., an ether solution) has the ability to dissolve lithium (e.g., lithium metal). Lithium easily releases electrons to form cations. Therefore, lithium donates electrons to the condensed aromatic compound in the solution and dissolves in the solution as cations. In this case, the condensed aromatic compound that has accepted the electrons solvates the electrons. The condensed aromatic compound solvating the electrons behaves as anions. Therefore, the condensed aromatic compound-containing solution itself has ion conductivity. In the condensed aromatic compound-containing solution, Li cations and electrons are present in equivalent amounts. Therefore, the condensed aromatic compound-containing solution itself can have strong reducing properties (in other words, can be electrochemically base).

Embodiment 4

Embodiment 4 will be described. However, the description will be omitted as appropriate when it overlaps with that of any of embodiments 1 to 3 above.

A flow battery in embodiment 4 includes, in addition to the structure of the flow battery in any of embodiments 1 to 3, the following structure.

Specifically, the flow battery in embodiment 4 includes the first liquid 110, the first electrode 210, the second liquid 120, the second electrode 220, and an electrolyte salt.

The first liquid 110 contains a condensed aromatic compound dissolved therein.

The first electrode 210 is immersed in the first liquid 110.

The second electrode 220 is a counter electrode of the first electrode 210. The second electrode 220 is immersed in the second liquid 120.

The electrolyte salt is dissolved in at least one of the first liquid 110 and the second liquid 120.

The concentration of the electrolyte salt in the first liquid 110 is equal to or lower than the concentration of the condensed aromatic compound in the first liquid 110.

With the above structure, the flow battery provided can have a high energy density. Specifically, when the concentration of the electrolyte salt in the first liquid 110 is set to be equal to or lower than the concentration of the condensed aromatic compound, the equilibrium potential of the condensed aromatic compound can be easily maintained. In other words, a significant increase in the equilibrium potential of the condensed aromatic compound (an increase caused by the electrolyte salt) can be prevented. This can prevent the equilibrium potential of the condensed aromatic compound from exceeding the equilibrium potential on the second electrode 220 side.

In the above structure, the electrolyte salt is dissolved in at least one liquid of the first liquid 110 and the second liquid 120. This can increase the ion conductivity of the at least one liquid.

In embodiment 4, the concentration of the electrolyte salt in the first liquid 110 may be lower than the concentration of the condensed aromatic compound in the first liquid 110.

With the above structure, the equilibrium potential of the condensed aromatic compound can be maintained easily. In other words, a significant increase in the equilibrium potential of the condensed aromatic compound (an increase caused by the electrolyte salt) can be further prevented. Therefore, the flow battery provided can have a higher energy density.

The flow battery in embodiment 4 may further include the separator 400.

The separator 400 separates the first electrode 210 and the first liquid 110 from the second electrode 220 and the second liquid 120.

In this case, the concentration of the electrolyte salt in the first liquid 110 may be lower than the concentration of the electrolyte salt in the second liquid 120.

In the above structure, the equilibrium potential of the condensed aromatic compound can be easily maintained (a change in the equilibrium potential can be further reduced). Therefore, the flow battery provided can have a high battery voltage (discharge voltage). Moreover, the flow battery provided can have a high energy density.

In embodiment 4, the electrolyte salt may be dissolved in the second liquid 120. In this case, the electrolyte salt may not be dissolved in the first liquid 110. Specifically, the concentration of the electrolyte salt in the first liquid 110 may be 0M.

In the above structure, the equilibrium potential of the condensed aromatic compound can be easily maintained (a change in the equilibrium potential can be further reduced). Therefore, the flow battery provided can have a higher battery voltage (discharge voltage). Moreover, the flow battery provided can have a higher energy density.

In embodiment 4, the first electrode 210 may be a negative electrode, and the second electrode 220 may be a positive electrode.

In embodiment 4, the electrolyte salt may be a lithium salt. The lithium salt used may be $LiBF_4$, $LiSbF_6$, $LiAsF_6$, $LiCF_3SO_3$, $LiN(SO_2CF_3)_2$, $LiN(SO_2C_2F_5)_2$, $LiN(SO_2CF_3)(SO_2C_4F_9)$, $LiC(SO_2CF_3)_3$, or $LiN(SO_2F)_2$. The lithium salt used may be one selected from these lithium salts. Alternatively, a mixture of two or more selected from these lithium salts may be used.

In embodiment 4, the electrolyte salt may be at least one selected from the group consisting of $LiBF_4$, $LiN(SO_2CF_3)_2$, $LiN(SO_2F)_2$, and $LiCF_3SO_3$.

FIGS. 5, 6, 7, and 8 are tables showing the results of measurement of the potentials of biphenyl solutions.

Each sample was prepared by dissolving biphenyl, i.e., a condensed aromatic compound, and an electrolyte salt in a 2-methyltetrahydrofuran (2MeTHF) solution at molar concentrations (M) shown in one of the tables. In samples shown in FIG. 5, $LiBF_4$ was used as the electrolyte salt. In samples shown in FIG. 6, $LiN(SO_2CF_3)_2$ was uses as the electrolyte salt. In samples shown in FIG. 7, $LiN(SO_2F)_2$ was used as the electrolyte salt. In samples shown in FIG. 8, $LiCF_3SO_3$ was used as the electrolyte salt. Potential measurement cells containing respective samples poured therein were produced, and the potential of each cell was measured. The potentials (V vs. $Li/Li^+$) measured with respect to lithium metal are shown in the tables.

As can be seen from FIGS. 5 to 8, when the concentration of the electrolyte salt is higher than the concentration of biphenyl, the equilibrium potential of biphenyl with respect to the potential of lithium metal increases as the concentration of the electrolyte salt increases.

However, when the concentration of the electrolyte salt is equal to or lower than the concentration of biphenyl, a significant increase in the equilibrium potential of biphenyl is prevented. For example, when the concentration of the electrolyte salt is equal to or lower than the concentration of biphenyl, the equilibrium potential of biphenyl can be maintained at 0.2 V vs. $Li/Li^+$ or lower.

FIG. 9 is a table showing the results of measurement of the potentials of trans-stilbene solutions.

Each sample was prepared by dissolving trans-stilbene, i.e., a condensed aromatic compound, and $LiBF_4$, i.e., an electrolyte salt, in a 2-methyltetrahydrofuran (2MeTHF) solution at molar concentrations shown in FIG. 9. Potential measurement cells containing respective samples poured therein were produced, and the potential of each cell was measured. FIG. 9 shows the potentials (V vs. $Li/Li^+$) measured with respect to lithium metal.

As can be seen from FIG. 9, when the concentration of the electrolyte salt is higher than the concentration of trans-stilbene, the equilibrium potential of trans-stilbene with respect to the potential of lithium metal increases as the concentration of the electrolyte salt increases.

However, when the concentration of the electrolyte salt is equal to or lower than the concentration of trans-stilbene, a significant increase in the equilibrium potential of trans-stilbene is prevented. For example, when the concentration of electrolyte salt is equal to or lower than the concentration of trans-stilbene, the equilibrium potential of trans-stilbene can be maintained within the range of 0.2 to 0.6 V vs. $Li/Li^+$.

Embodiment 5

Embodiment 5 will be described. However, the description will be omitted as appropriate when it overlaps with that of any of embodiments 1 to 4 above.

A flow battery in embodiment 5 includes, in addition to the structure of the flow battery in any of embodiments 1 to 3 above, the following structure.

In a flow battery in embodiment 5, the first liquid 110 contains dissolved therein a condensed aromatic compound and an electrolyte salt.

The electrolyte salt dissolved in the first liquid 110 is $LiPF_6$.

With the above structure, the flow battery provided can have a high energy density. Specifically, when the electrolyte salt in the first liquid 110 is $LiPF_6$, the equilibrium potential of the condensed aromatic compound can be maintained even when the concentration of the electrolyte salt is set arbitrarily relative to the concentration of the condensed aromatic compound. In other words, the ion conductivity can be improved by the addition of a sufficient amount of $LiPF_6$, while a significant increase in the equilibrium potential of the condensed aromatic compound (an increase caused by the electrolyte salt) is prevented. Specifically, the ion conductivity can be increased while the equilibrium potential of the condensed aromatic compound is prevented from exceeding the equilibrium potential on the second electrode 220 side.

The flow battery in embodiment 5 may further include the second liquid 120 and the second electrode 220.

The second electrode 220 is a counter electrode of the first electrode 210. The second electrode 220 is immersed in the second liquid 120.

In this case, $LiPF_6$, i.e., the electrolyte salt, may be dissolved in the second liquid 120.

In the above structure, $LiPF_6$, i.e., the electrolyte salt, is dissolved in at least one liquid of the first liquid 110 and the second liquid 120, and the ion conductivity of the at least one liquid can thereby be increased.

The flow battery in embodiment 5 may further include the separator 400. The separator 400 separates the first electrode 210 and the first liquid 110 from the second electrode 220 and the second liquid 120.

In the above structure, the equilibrium potentials of the condensed aromatic compound can be easily maintained (a change in the equilibrium potential can be further reduced). Therefore, the flow battery provided can have a higher battery voltage (discharge voltage). Moreover, the flow battery provided can have a higher energy density.

In embodiment 5, the first electrode 210 may be a negative electrode, and the second electrode 220 may be a positive electrode.

FIG. 10 is a table showing the results of measurement of the potentials of biphenyl solutions.

Each sample was prepared by dissolving biphenyl, i.e., a condensed aromatic compound, and $LiPF_6$, i.e., an electrolyte salt, in a 2-methyltetrahydrofuran (2MeTHF) solution at molar concentrations (M) shown in FIG. 10. Potential measurement cells containing respective samples poured therein were produced, and the potential of each cell was measured. FIG. 10 shows the potentials (V vs. $Li/Li^+$) measured with respect to lithium metal. As shown in FIG. 10, even when the concentration of the electrolyte salt $LiPF_6$ is higher (and also lower) than the concentration of biphenyl, the equilibrium potential of biphenyl with respect to the potential of lithium metal can be maintained at 0.2 V vs. $Li/Li^+$ or lower.

FIG. 11 is a table showing the results of measurement of the potentials of trans-stilbene solutions.

Each sample was prepared by dissolving trans-stilbene, i.e., a condensed aromatic compound, and $LiPF_6$, i.e., an electrolyte salt, in a 2-methyltetrahydrofuran (2MeTHF) solution at molar concentrations (M) shown in FIG. 11. Potential measurement cells containing respective samples poured therein were produced, and the potential of each cell was measured. FIG. 11 shows the potentials (V vs. $Li/Li^+$) measured with respect to lithium metal. As shown in FIG. 11, even when the concentration of the electrolyte salt $LiPF_6$ is higher (and also lower) than the concentration of trans-stilbene, the equilibrium potential of trans-stilbene with respect to the potential of lithium metal can be maintained at around 0.3 V vs. $Li/Li^+$.

Embodiment 6

Embodiment 6 will be described. However, the description will be omitted as appropriate when it overlaps with that of any of embodiments 1 to 5 above.

A flow battery in embodiment 6 includes, in addition to the structure of the flow battery in any of embodiments 1 to 5 above, the following structure.

Specifically, in the flow battery in embodiment 6, the first liquid 110 is prepared by dissolving a condensed aromatic compound in at least one selected from the group consisting of tetrahydrofuran, 2-methyltetrahydrofuran, 1,2-dimethoxyethane, 2,5-dimethyltetrahydrofuran, diethoxyethane, dibutoxyethane, diethylene glycol dimethyl ether, triethylene glycol dimethyl ether, tetraethylene glycol dimethyl ether, 3-methylsulfolane, and tetrahydrofurfurylamine.

In the above structure, the first liquid 110 provided can have the function of stabilizing solvated electrons released from lithium and paired with the condensed aromatic compound and can dissolve lithium (e.g., lithium metal).

FIG. 12 is a table showing samples of the first liquid.

Biphenyl used as the condensed aromatic compound was dissolved in the samples (solvents) shown in FIG. 12 at a concentration of 0.1M to prepare solutions, and lithium metal pieces were added to the prepared solutions. Each solution was left to stand, and dissolution of lithium metal was visually checked.

When lithium metal gives solvated electrons to a colorless solution and dissolves as lithium ions, the solution is colored. The occurrence of dissolution of lithium metal can be determined by disappearance of the lithium metal.

In FIG. 12, "○ (yes)" denotes a sample with dissolution of lithium metal. In FIG. 12, "× (no)" denotes a sample with no dissolution of lithium metal.

FIG. 13 is a table showing other samples of the first liquid.

Each sample shown in FIG. 13 was prepared by mixing a solvent X and a solvent Y shown in FIG. 13 at a volume mixing ratio shown in FIG. 13.

For each of the samples shown in FIG. 13, the same experiment as that for the samples shown in FIG. 12 was performed to check dissolution of lithium metal.

As shown in FIG. 12, when dibutoxymethane, anisole, or phenetole was used alone, the solvent did not exhibit the ability to dissolve lithium metal. However, as shown in FIG. 13, mixtures of dibutoxyethane with dibutoxymethane, anisole, and phenetole exhibited the ability to dissolve lithium metal.

It was found that when a solvent having the ability to dissolve lithium metal coexists, the ability to dissolve lithium metal can be imparted to a solvent having no ability to dissolve lithium metal, as described above.

The structures described in embodiments 1 to 6 above may be appropriately combined.

The flow battery of the present disclosure can be preferably used as an electricity storage device.

What is claimed is:

1. A flow battery comprising: a lithium precipitate particle made of lithium only;
   a first liquid containing dissolved therein a condensed aromatic compound and lithium that emits a solvated electron to be a cation;
   a first electrode immersed in the first liquid to generate the lithium precipitate particle by making the lithium precipitated; and
   a first circulator including a first container and a first filter,
   wherein the first circulator circulates the first liquid between the first electrode and the first container,
   wherein the first circulator transfers the lithium precipitate particle generated on the first electrode to the first container,
   wherein the first container stores the lithium precipitate particle,
   wherein the first filter is disposed in a channel through which the first liquid flows from the first container to the first electrode, and
   wherein the first filter filters out the lithium precipitate particle.

2. The flow battery according to claim 1,
   wherein, during charging, the first electrode reduces the condensed aromatic compound,
   wherein, during charging, the first electrode generates the lithium precipitate particle,
   wherein, during discharging, the first electrode oxidizes the condensed aromatic compound, and
   wherein, during discharging, the lithium precipitate particle dissolves in the first liquid.

3. The flow battery according to claim 1,
   wherein the first filter is at least one of a glass fiber paper filter, a polypropylene nonwoven fabric, a polyethylene nonwoven fabric, and a metal mesh unreactive with the lithium.

4. The flow battery according to claim 1,
   wherein the condensed aromatic compound is at least one selected from the group consisting of phenanthrene, biphenyl, O-terphenyl, trans-stilbene, triphenylene, anthracene, butyrophenone, valerophenone, acenaphthene, acenaphthylene, fluoranthene, and benzil.

5. The flow battery according to claim 1, further comprising an electrolyte salt,
   wherein the electrolyte salt is dissolved in the first liquid, and
   wherein a concentration of the electrolyte salt in the first liquid is equal to or lower than a concentration of the condensed aromatic compound in the first liquid.

6. The flow battery according to claim 5,
   wherein the electrolyte salt is at least one selected from the group consisting of $LiBF_4$, $LiN(SO_2CF_3)_2$, $LiN(SO_2F)_2$ and $LiCF_3SO_3$.

7. The flow battery according to claim 1,
   wherein an electrolyte salt is dissolved in the first liquid, and
   wherein the electrolyte salt is $LiPF_6$.

8. The flow battery according to claim 1,
   wherein the first liquid contains at least one selected from the group consisting of tetrahydrofuran, 2methyl-tetrahydrofuran, 1,2dimethoxyethane, 2,5-dimethyltetrahydrofuran, diethoxyethane, dibutoxyethane, diethylene glycol dimethyl ether, triethylene glycol dimethyl ether, tetraethylene glycol dimethyl ether, 3methylsulfolane, and tetrahydrofurfurylamine.

9. The flow battery according to claim 1, further comprising:
   a second liquid containing a second electrode-side mediator dissolved therein;
   a second electrode that serves as a counter electrode of the first electrode and is immersed in the second liquid;
   a second active material immersed in the second liquid; and
   a separator that separates the first electrode and the first liquid from the second electrode and the second liquid,
   wherein the second electrode oxidizes and reduces the second electrode-side mediator, and
   wherein the second active material oxidizes and reduces the second electrode-side mediator.

10. The flow battery according to claim 9, further comprising an electrolyte salt,
    wherein the electrolyte salt is dissolved in at least one of the first liquid and the second liquid, and
    wherein a concentration of the electrolyte salt in the first liquid is lower than a concentration of the electrolyte salt in the second liquid.

11. The flow battery according to claim 10,
    wherein the electrolyte salt is dissolved in the second liquid and is not dissolved in the first liquid.

12. The flow battery according to claim 9,
    wherein the lithium is dissolved in the second liquid,
    wherein, during charging, the second electrode oxidizes the second electrode-side mediator,
    wherein, during charging, the second active material reduces the second electrode-side mediator oxidized by the second electrode to release the lithium,
    wherein, during discharging, the second electrode reduces the second electrode-side mediator, and
    wherein, during discharging, the second active material oxidizes the second electrode-side mediator reduced by the second electrode to occlude the lithium.

13. The flow battery according to claim 9,
    wherein the second electrode-side mediator is tetrathiafulvalene.

14. The flow battery according to claim 9,
    wherein the second active material is lithium iron phosphate.

15. The flow battery according to claim 9, further comprising
    a second circulator,
    wherein the second circulator circulates the second liquid between the second electrode and the second active material.

16. The flow battery according to claim 15,
    wherein the second circulator includes a second container,
    wherein the second active material and the second liquid are contained in the second container,
    wherein the second circulator circulates the second liquid between the second electrode and the second container,
    wherein the second active material comes into contact with the second liquid within the second container, and the second electrode-side mediator is thereby oxidized and reduced by the second active material, and
    wherein, within the second container, the second active material oxidizes and reduces the second electrode-side mediator in contact with the second active material.

17. The flow battery according to claim 16,
    wherein the second circulator includes a second filter that filters out the second active material, and
    wherein the second filter is disposed in a channel through which the second liquid flows from the second container to the second electrode.

* * * * *